US010588058B2

(12) United States Patent
Uchino et al.

(10) Patent No.: US 10,588,058 B2
(45) Date of Patent: Mar. 10, 2020

(54) USER EQUIPMENT, BASE STATION AND COMMUNICATION METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/573,650

(22) PCT Filed: Mar. 23, 2016

(86) PCT No.: PCT/JP2016/059167
§ 371 (c)(1),
(2) Date: Nov. 13, 2017

(87) PCT Pub. No.: WO2016/185790
PCT Pub. Date: Nov. 24, 2016

(65) Prior Publication Data
US 2018/0152868 A1    May 31, 2018

(30) Foreign Application Priority Data
May 15, 2015  (JP) .................................. 2015-100563

(51) Int. Cl.
*H04W 36/00*      (2009.01)
*H04W 36/06*      (2009.01)
(Continued)

(52) U.S. Cl.
CPC ....... *H04W 36/0055* (2013.01); *H04W 28/06* (2013.01); *H04W 28/12* (2013.01);
(Continued)

(58) Field of Classification Search
None
See application file for complete search history.

(56) References Cited

U.S. PATENT DOCUMENTS

| 8,161,341 B2* | 4/2012 | Lee ..................... H04L 1/1614 370/231 |
| 2003/0210676 A1* | 11/2003 | Wu ........................ H04L 47/10 370/350 |

(Continued)

FOREIGN PATENT DOCUMENTS

| EP | 2854443 A1 | 4/2015 |
| JP | 2010-220215 A | 9/2010 |
| JP | 2013-223074 A | 10/2013 |

OTHER PUBLICATIONS

International Search Report issued in corresponding application No. PCT/JP2016/059167 dated Jun. 7, 2016 (4 pages).
(Continued)

*Primary Examiner* — Hong S Cho
(74) *Attorney, Agent, or Firm* — Osha Liang LLP

(57) ABSTRACT

There is provided user equipment for communicating with a base station in a mobile communication system supporting LTE including a reception unit configured to receive an indication from the base station to change a sequence number length of an RLC PDU, a re-establishment unit configured to perform re-establishment of an RLC entity upon receiving the indication, and a communication unit configured to use the RLC PDU with the changed sequence number length to communicate with the base station after completion of the re-establishment.

11 Claims, 6 Drawing Sheets

(51) Int. Cl.
     H04W 28/12    (2009.01)
     H04W 76/15    (2018.01)
     H04W 28/06    (2009.01)
     H04W 36/16    (2009.01)
     H04W 16/32    (2009.01)
     H04W 80/02    (2009.01)
     H04W 84/04    (2009.01)
     H04W 88/02    (2009.01)
     H04W 88/08    (2009.01)

(52) U.S. Cl.
     CPC .......... *H04W 36/06* (2013.01); *H04W 36/16* (2013.01); *H04W 76/15* (2018.02); *H04W 16/32* (2013.01); *H04W 80/02* (2013.01); *H04W 84/042* (2013.01); *H04W 88/02* (2013.01); *H04W 88/08* (2013.01)

(56) References Cited

U.S. PATENT DOCUMENTS

| | | | | |
|---|---|---|---|---|
| 2010/0232376 | A1* | 9/2010 | Wu | H04W 76/20 370/329 |
| 2013/0016841 | A1 | 1/2013 | Fong et al. | |
| 2014/0071948 | A1* | 3/2014 | Kim | H04L 1/1841 370/331 |
| 2015/0045052 | A1* | 2/2015 | Pao | H04W 88/06 455/453 |
| 2016/0338092 | A1* | 11/2016 | Agiwal | H04W 72/1289 |

OTHER PUBLICATIONS

Written Opinion of the International Searching Authority issued in corresponding application No. PCT/JP2016/059167 dated Jun. 7, 2016 (6 pages).
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (20 pages).
3GPP TS 36.306 V12.4.0, "3rd Generation Partnership Project; Technical Specification Group Radio Access Network; Evolved Universal Terrestrial Radio Access (E-UTRA); User Equipment (UE) radio access capabilities (Release 12)"; Mar. 2015 (2 pages).
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)"; Mar. 2015 (40 pages).
Intel Corporation, "Support of CA with up to 32 carriers"; 3GPP TSG RAN WG2 Meeting #89BIS, R2-151105; Bratislava, Slovakia; Apr. 20-24, 2015 (4 pages)
Office Action entitled, "Notification of Reasons for Refusal" issued in Japanese Application No. 2015-100563 dated May 31, 2016 (9 pages).
Office Action entitled, "Notification of Reasons for Refusal" issued in Japanese Application No. 2015-100563 dated Nov. 29, 2016 (9 pages).
Office Action entitled, "Decision to Decline the Amendment" issued in Japanese Application No. 2015-100563 dated Jun. 6, 2017.
Office Action entitled, "Decision of Refusal" issued in Japanese Application No. 2015-100563 dated Jun. 6, 2017 (2 pages).
Office Action entitled, "Report of Reconsideration by Examiner before Appeal" issued in Japanese Application No. 2015-100563 dated Sep. 26, 2017 (7 pages).
Extended European Search Report issued in the counterpart European Patent Application No. 176796184.6, dated Apr. 24, 2018 (11 pages).
NTT Docomo, Inc.; "Configuration of Extended L2 Header"; 3GPP TSG-RAN WG2 Meeting #92 R2-156167; Anaheim, USA, Nov. 16-20, 2015 (3 pages).
Ericsson et al.; "Limitation of PDCP SN and FMS-fields"; 3GPP TSG-RAN WG2 #79 Tdoc R2-123875; QingDao; China, Aug. 13-17, 2012 (9 pages).
Office Action issued in corresponding Japanese Application No. 2015-100563, dated Sep. 18, 2018 (3 pages).

* cited by examiner

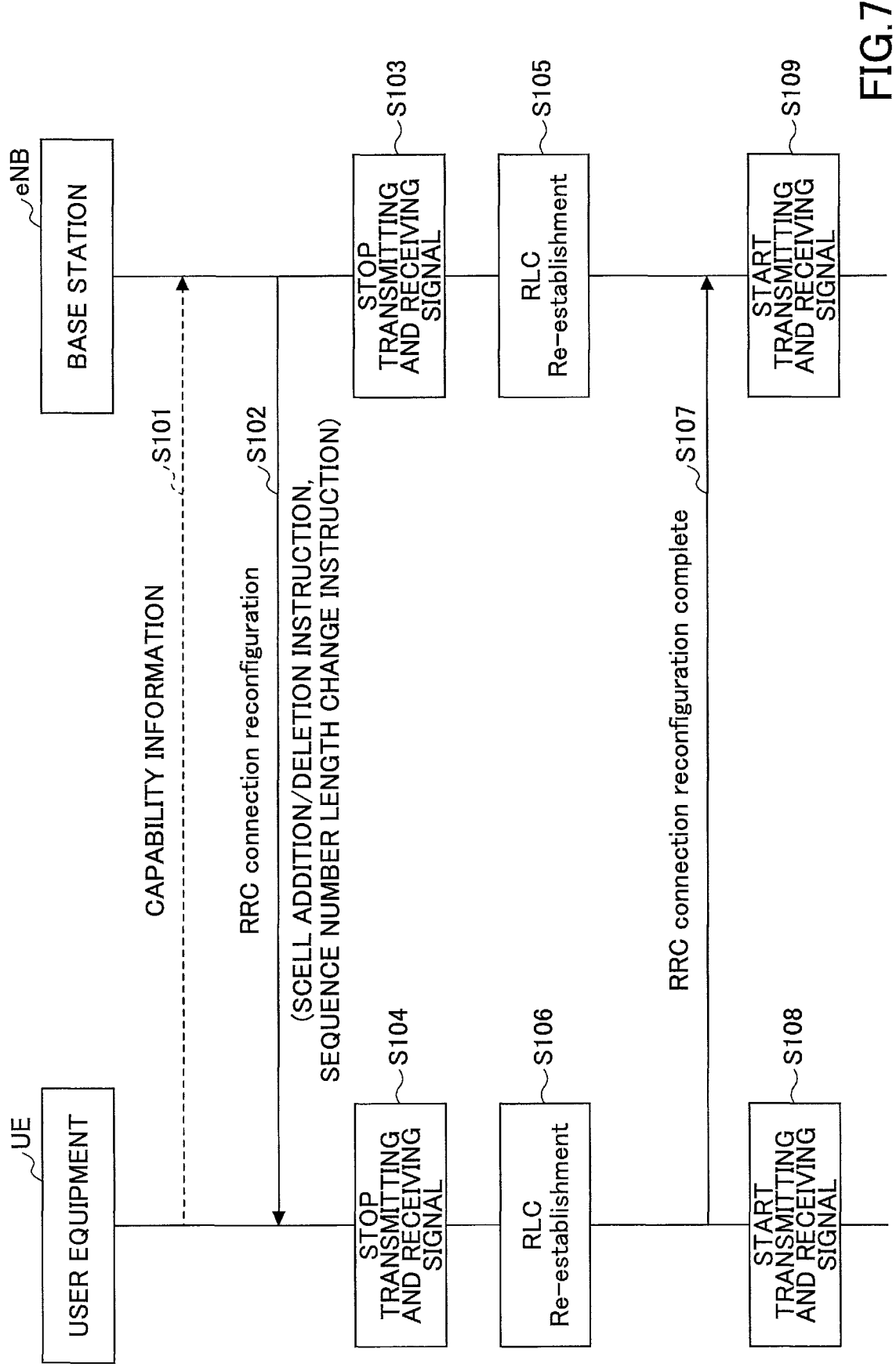

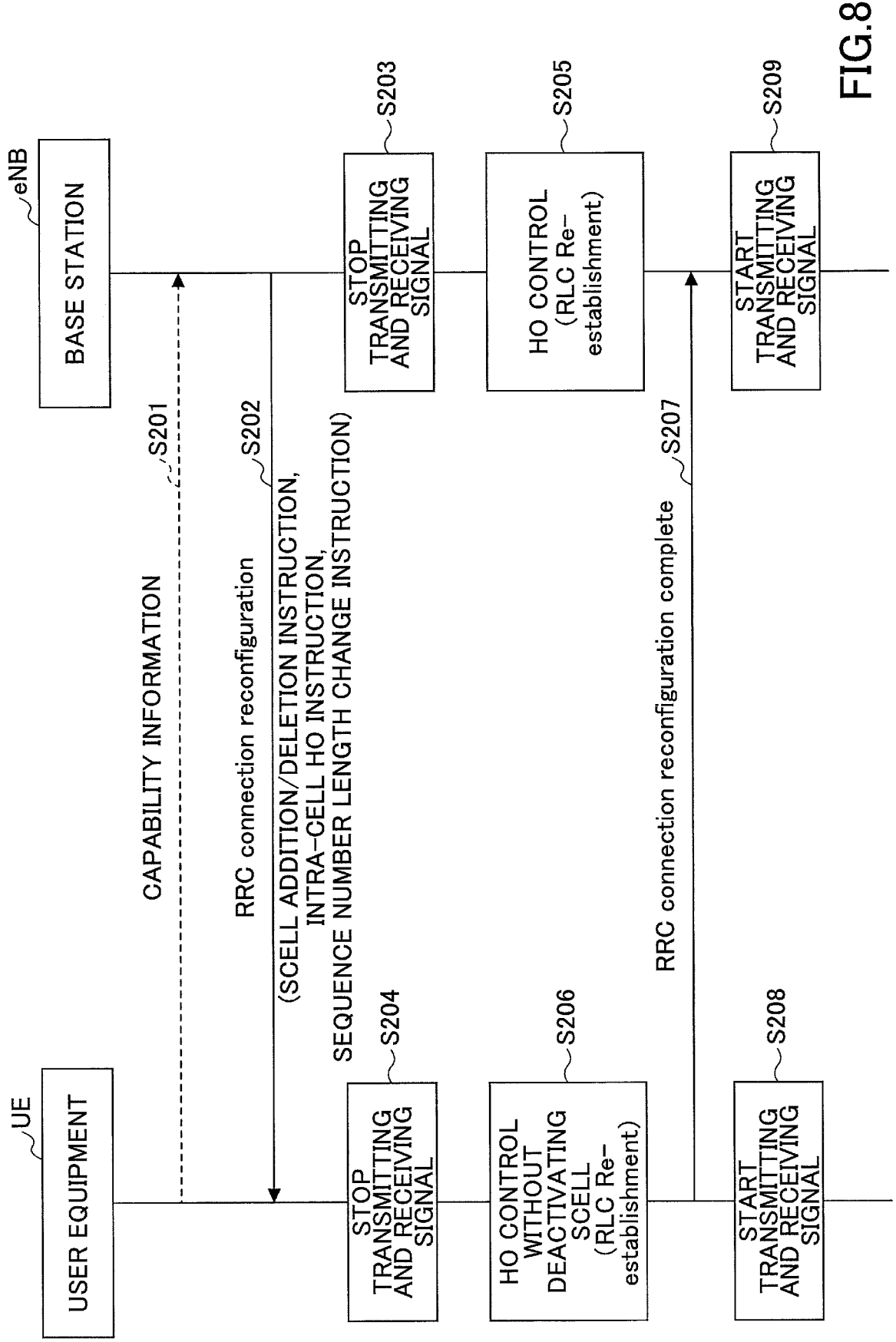

USER EQUIPMENT, BASE STATION AND COMMUNICATION METHOD

TECHNICAL FIELD

The present invention relates to user equipment, a base station and a communication method.

BACKGROUND ART

In an LTE (Long Term Evolution) system, carrier aggregation (CA), where multiple carriers are simultaneously used for communication as a fundamental unit of a predetermined bandwidth (maximum 20 MHz), is adopted. The carrier serving as the fundamental unit in the carrier aggregation is referred to as a component carrier (CC).

When the CA is performed, user equipment is configured with a PCell (Primary Cell) as a cell having high reliability for ensuring connectivity and an SCell (Secondary Cell) as an additional cell. The user equipment can first connect to the PCell and then add the SCell as needed. The PCell is the same cell as a single cell for supporting RLM (Radio Link Monitoring), SPS (Semi-Persistent Scheduling) or the like.

The SCell is a cell configured for the user equipment in addition to the PCell. Addition and deletion of the SCell is conducted by RRC (Radio Resource Control) signaling. The SCell is in a deactivated state immediately after it is configured for the user equipment and accordingly is a cell allowed for communication (scheduling) upon activation.

Also, RLC (Radio Link Control) is used for radio communication between the user equipment and a base station in the LTE system. The RLC can configure any of multiple forwarding modes for each radio bearer. Specifically, there are an RLC-AM (RLC-Acknowledge Mode) where retransmission control is performed based on acknowledgement signals from a receiver side, an RLC-UM (RLC-Unacknowledge Mode) where the retransmission control is not performed, and a TM (Transparent Mode) where the RLC itself is made transparent. The RLC performs communication by exchanging RLC PDU (Protocol Data Units) between an RLC entity in the user equipment side and an RLC entity in the base station side. Also, in the RLC-AM and the RLC-UM, sequence numbers (SNs) attached to a header of the RLC PDU are used for redundancy detection and reordering of the RLC PDUs. The length of the RLC sequence number is specified to have 10 bits in the RLC-AM and 5 or 10 bits in the RLC-UM (see non-patent document 1, for example).

PRIOR ART DOCUMENT

Non-Patent Document

Non-patent document 1: 3GPP TS36.322 V12.2.0 (2015-03)

SUMMARY OF INVENTION

Problem to be Solved by the Invention

In conventional LTE specifications, the number of CCs configurable for each user equipment is at most five, whereas in the LTE of Rel. 13, CA enhancement having limitation on at most five CCs being bundled in the CA is being discussed to implement more flexible and faster radio communication and to allow many CCs to be bundled in an unlicensed band having a continuous ultra-wide band. For example, CA for allowing at most 32 CCs to be bundled is being discussed. According to the CA for allowing at most 32 CCs to be bundled, it is assumed that an achievable peak rate can be rapidly improved.

Here, in the RLC, window control to limit the number of RLC PDUs that can be transmitted simultaneously is performed for the redundancy detection and the reordering. According to the window control, the number of RLC PDUs that can be transmitted simultaneously is limited to half of the maximum sequence number. In other words, even if the CA rapidly improves the peak rate, the window control performed in the RLC may become a bottleneck. Accordingly, if the CCs bundled in the CA are enhanced, it is desirable that the maximum RLC sequence number may be enhanced at the same time to prevent the window control in the RLC from being the bottleneck. In other words, it is desirable that the sequence number is enhanced to be more than or equal to 11 bits in length.

FIG. 1 is a diagram for illustrating a conventional RLC PDU format. The RLC PDU format as illustrated in FIG. 1 is a PDU format for use in the RLC-AM. As illustrated in FIG. 1, the sequence number is 10 bits in length, and no reserved area is provided. Accordingly, in order to enhance the length of the sequence number to have more than or equal to 11 bits, the data size of the header portion (portion other than data) needs to be increased to be more than or equal to one octet (one byte).

In this manner, if the length of the RLC sequence number is changed, the data size of the header portion of the RLC PDU would be changed. Accordingly, if the length of the RLC sequence number is changed, re-establishment of the RLC entity (RLC re-establishment) needs to be performed to delete (reset) a PDU including the pre-changed shorter sequence number.

In the current LTE system, the re-establishment of the RLC entity is performed only when a handover operation is performed. In other words, the handover operation is necessarily performed to perform the re-establishment of the RLC entity while following operations specified in the current LTE system.

Also, in the current LTE system, when the handover operation is performed, all SCells are temporarily changed into a deactivated state. Accordingly, all the SCells have to be changed into an activated state after the handover operation, which may result in decreased throughput.

In light of the above problems, an object of the disclosed technique is to provide techniques for changing the length of the sequence number of RLC PDUs while controlling against throughput reduction.

Means for Solving the Problem

User equipment according to a disclosed technique is user equipment for communicating with a base station in a mobile communication system supporting LTE, comprising: a reception unit configured to receive an indication from the base station to change a sequence number length of an RLC PDU; a re-establishment unit configured to perform re-establishment of an RLC entity upon receiving the indication; and a communication unit configured to use the RLC PDU with the changed sequence number length to communicate with the base station after completion of the re-establishment.

Advantage of the Invention

According to the disclosed technique, techniques for changing the length of the sequence number of RLC PDUs while controlling against the throughput reduction are provided.

BRIEF DESCRIPTION OF DRAWINGS

FIG. 7 is a sequence diagram for illustrating an exemplary first procedure according to an embodiment; and FIG. 8 is a sequence diagram for illustrating an exemplary second procedure according to an embodiment.

EMBODIMENTS OF THE INVENTION

Embodiments of the present invention are described below with reference to the drawings. Note that the embodiments as described below are merely exemplary and the present invention applied embodiments are not limited to the embodiments below. For example, it is assumed that the mobile communication system according to the embodiments is an LTE compliant system, but the present invention is not limited to the LTE and can be applied to other schemes. Note that the term. "LTE" herein is used to cover not only communication schemes corresponding to 3GPP Release 8 or 9 but also communication schemes corresponding to 3GPP Release 10, 11, 12 or 13 or subsequent Releases.

SUMMARY

Figure 1:
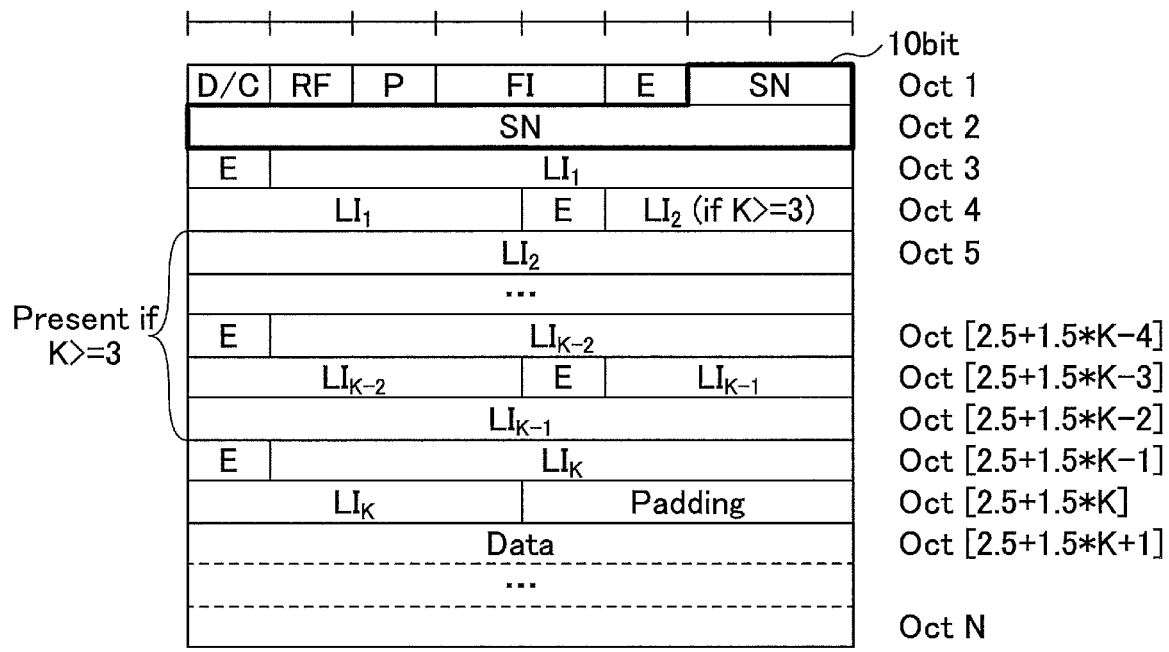
FIG. 1 is a diagram for illustrating a conventional RLC PDU format.
Figure 2:
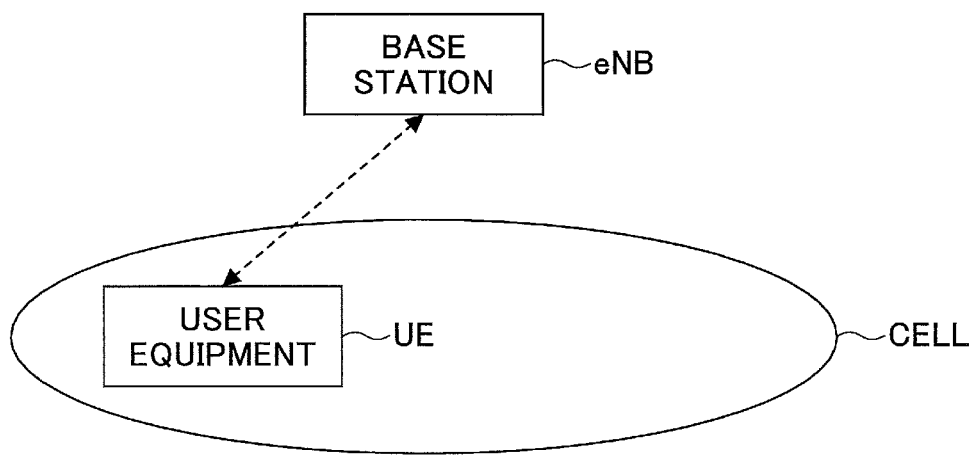
FIG. 2 is a diagram for illustrating an exemplary arrangement of a mobile communication system according to an embodiment.

FIG. 2 is a diagram for illustrating a mobile communication system according to an embodiment. As illustrated in FIG. 2, the mobile communication system according to this embodiment is a mobile communication system including user equipment UE and a base station eNB, and CA communication can be performed between the user equipment UE and the base station eNB.

Also, in the example in FIG. 2, one cell is illustrated, but it is for convenience of illustration, and multiple cells exist in configured CA. Also, for example, an RRE connected to the base station eNB via an optical fiber or the like may be provided at a remote location from the base station eNB.

The base station eNB performs communication with the user equipment UE over the air. The base station eNB is arranged with hardware resources, for example, a CPU such as a processor, a memory device such as a ROM, a RAM or a flash memory, an antenna to communicate with the user equipment UE or the like and a communication interface device to communicate with adjacent base stations eNBs, a core network or the like. Functionalities and operations of the base station eNB may be implemented by the processor running or executing data and programs stored in the memory device. However, the base station eNB is not limited to the above-stated hardware arrangement and may have any other appropriate hardware arrangement.

The user equipment UE has functionalities of communicating with the base station eNB, the core network and so on over the air. The user equipment UE is a mobile phone, a smartphone, a tablet, a mobile router, a wearable terminal or the like, for example. The user equipment (UE) may be any type of user equipment UE having communication functionalities. The user equipment UE is arranged with hardware resources, for example, a CPU such as a processor, a memory device such as a ROM, a RAM or a flash memory, an antenna to communicate with the base station eNB, an RF (Radio Frequency) device and so on. Functionalities and operations of the user equipment UE may be implemented by the processor running and executing data and programs stored in the memory device. However, the user equipment UE is not limited to the above-stated hardware arrangement and may have any other appropriate hardware arrangement.

The mobile communication system according to this embodiment enhances the length of the sequence number of RLC PDUs to improve the peak rate, for example, when an SCell is added in the CA. On the other hand, when an SCell is deleted in the CA, the length of the sequence number of RLC PDUs may be made shorter to reduce the data size of the RLC PDUs. Also, when the length of the sequence number of RLC PDUs is changed, no SCell already bundled in the CA is deactivated.

<Functional Arrangement>
(Base Station)

Figure 3:
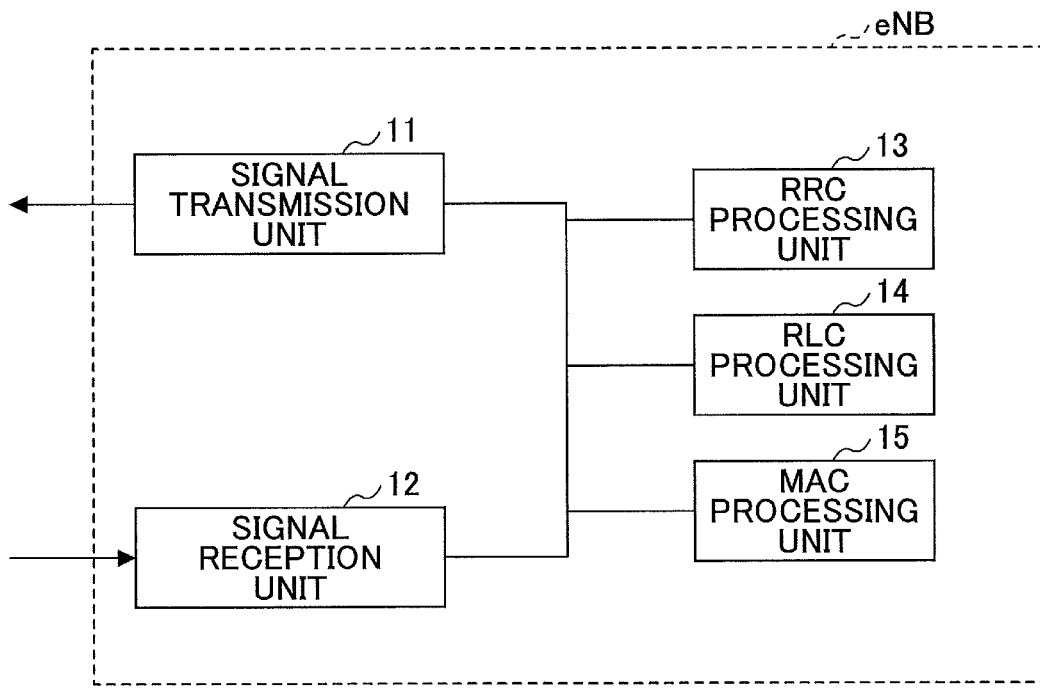
FIG. 3 is a diagram for illustrating an exemplary functional arrangement of a base station according to an embodiment.

FIG. 3 is a diagram for illustrating an exemplary functional arrangement of a base station according to an embodiment. As illustrated in FIG. 3, the base station eNB has a signal transmission unit 11, a signal reception unit 12, an RRC processing unit 13, an RLC processing unit 14 and a MAC (Media Access Control) processing unit 15. Note that FIG. 3 illustrates only functional units in the base station eNB particularly related to the embodiment of the present invention and functionalities not shown to perform at least LTE compliant operations are also included. Also, the functional arrangement as illustrated in FIG. 3 is merely exemplary. As long as the operations according to this embodiment can be performed, functional segmentation and names of the functional units may be arbitrary.

The signal transmission unit 11 includes a functionality to generate and wirelessly transmit various signals for a physical layer from signals of an upper layer to be transmitted from the base station eNB. The signal reception unit 12 includes a functionality to wirelessly receive various signals from the user equipment UE and obtain signals of the upper layer from the received physical layer signals.

The RRC processing unit 13 transmits and receives RRC signals to and from the user equipment UE and performs various operations related to the RRC layer. Also, the RRC processing unit 13 has a functionality to instruct the user equipment UE to change the length of the sequence number of RLC PDUs, a functionality to instruct the user equipment to perform handover operations and a functionality to instruct the user equipment UE to add or delete an SCell. Also, the RRC processing unit 13 has a functionality to obtain information indicating that the user equipment UE has a capability of changing the length of the sequence number of RLC PDUs (referred to as "capability information" hereinafter) from the user equipment UE.

The RLC processing unit 14 transmits and receives RLC PDUs to and from the user equipment UE and performs various operations related to the RLC layer. Also, the RLC processing unit 14 has a functionality to perform re-establishment of an RLC entity (RLC Re-establishment) upon an instruction from the RRC processing unit 13 and delete (reset) a PDU including a pre-changed short sequence number. Also, the RLC processing unit 14 has a functionality to use an RLC PDU format, where the sequence number of more than or equal to 11 bits can be stored, to transmit and receive RLC PDUs.

The MAC processing unit 15 performs various operations related to the MAC layer. Also, the MAC processing unit 15 has a functionality to instruct the user equipment UE to activate and deactivate an SCell.

(User Equipment)

Figure 4:
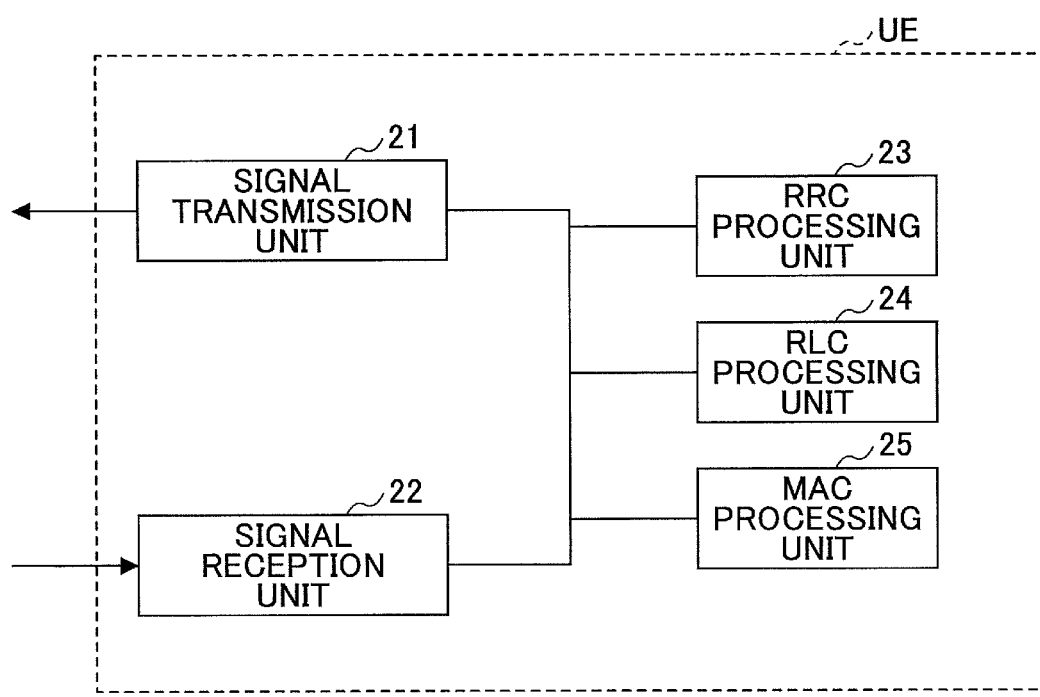
FIG. 4 is a diagram for illustrating an exemplary functional arrangement of user equipment according to an embodiment.

FIG. 4 is a diagram for illustrating an exemplary functional arrangement of a base station according to an embodiment. As illustrated in FIG. 4, the user equipment UE has a signal transmission unit 21, a signal reception unit 22, an RRC processing unit 23, an RLC processing unit 24 and a MAC processing unit 25. Note that FIG. 4 illustrates only functional units in the user equipment UE particularly related to the embodiment of the present invention and functionalities not shown to perform at least LTE compliant operations are also included. Also, the functional arrangement as illustrated in FIG. 4 is merely exemplary. As long as the operations according to this embodiment can be performed, functional segmentation and names of the functional units may be arbitrary.

The signal transmission unit 21 includes a functionality to generate and wirelessly transmit various signals for a physical layer from signals of an upper layer to be transmitted from the user equipment UE. The signal reception unit 22 includes a functionality to wirelessly receive various signals from the base station eNB and obtain signals of an upper layer from the received physical layer signals.

The RRC processing unit 23 transmits and receives RRC signals to and from the base station eNB and performs various operations related to the RRC layer. Also, the RRC processing unit 23 has a functionality to change the length of the sequence number of RLC PDUs upon an instruction from the base station eNB, a functionality to perform handover operations upon an instruction from the base station eNB and a functionality to add or delete an SCell upon an instruction from the base station eNB. Also, the RRC processing unit 23 has a functionality to transmit capability information to the base station eNB.

The RLC processing unit 24 transmits and receives RLC PDUs to and from the base station eNB and performs various operations related to the RLC layer. Also, the RLC processing unit 24 has a functionality to perform re-establishment of an RLC entity (RLC Re-establishment) upon an instruction from the RRC processing unit 23 and delete (reset) a PDU including a pre-changed short sequence number. Also, the RLC processing unit 24 has a functionality to use an RLC PDU format, where the sequence number of more than or equal to 11 bits can be stored, to transmit and receive RLC PDUs.

The MAC processing unit 25 performs various operations related to the MAC layer. Also, the MAC processing unit 25 has a functionality to activate and deactivate an SCell. Also, the MAC processing unit 25 has a deactivation timer and deactivates an SCell if there is no communication at the SCell for a predetermined time. Also, the MAC processing unit 25 has a functionality to prevent an SCell from being deactivated as needed instead of always deactivating the SCell when the RRC layer performs the handover operation.

The above-stated functional arrangements of the base station eNB and the user equipment UE may be entirely implemented in a hardware circuit (for example, one or more IC chips). Alternatively, a part of the arrangements may be arranged with a hardware circuit, and the others may be implemented in a CPU and programs.

(Base Station)

Figure 5:
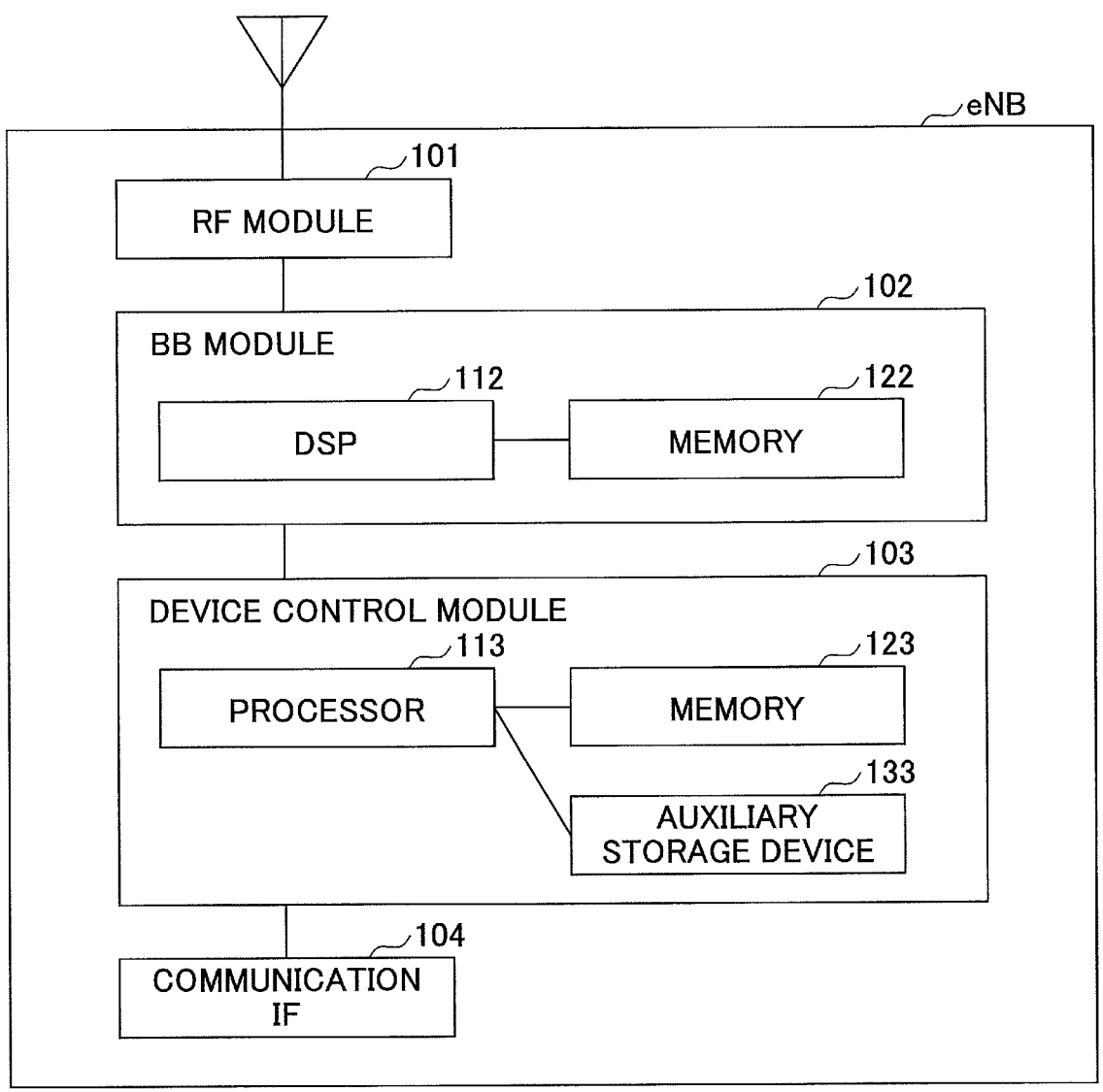
FIG. 5 is a diagram for illustrating an exemplary hardware arrangement of a base station according to an embodiment.

FIG. 5 is a diagram for illustrating an exemplary hardware arrangement of a base station according to an embodiment. FIG. 5 illustrates an arrangement closer to an implementation than FIG. 3. As illustrated in FIG. 5, the base station eNB has an RF (Radio Frequency) module 101 to perform operations related to radio signals, a BB (Base Band) processing module 102 to perform baseband signal operations, a device control module 103 to perform operations for an upper layer or the like and a communication IF 104 serving as an interface to connect to a network.

The RF module 101 performs D/A (Digital-to-Analog) conversion, modulation, frequency conversion, power amplification and the like on digital baseband signals received from the BB processing module 102 to generate radio signals to be transmitted from an antenna. Also, the RF module 101 performs frequency conversion, A/D (Analog-to-Digital) conversion, demodulation and the like on received radio signals to generate digital baseband signals and pass them to the BB processing module 102. The RF module includes a portion of the signal transmission unit 11 and a portion of the signal reception unit 12 as illustrated in FIG. 3.

The BB processing module performs operations to interexchange between IP packets and digital baseband signals. The DSP (Digital Signal Processor) 112 is a processor to perform signal processing at the BB processing module 102. The memory 122 is used as a working area for the DSP 112. For example, the BB processing module 102 may include a portion of the signal transmission unit 11, a portion of the signal reception unit 12, the RLC processing unit 14 and the MAC processing unit 15 as illustrated in FIG. 3.

The device control module 103 performs protocol operations for an IP layer, OAM (Operation and Maintenance) operations or the like. The processor 113 is a processor for performing operations executed by the device control module 103. The memory 123 is used as a working area for the processor 113. The auxiliary storage device 133 is a HDD or the like, for example, and stores various configuration information or the like for operations of the base station eNB itself. The device control module 103 includes the RRC processing unit 13, as illustrated in FIG. 3, for example.

(User Equipment)

Figure 6:
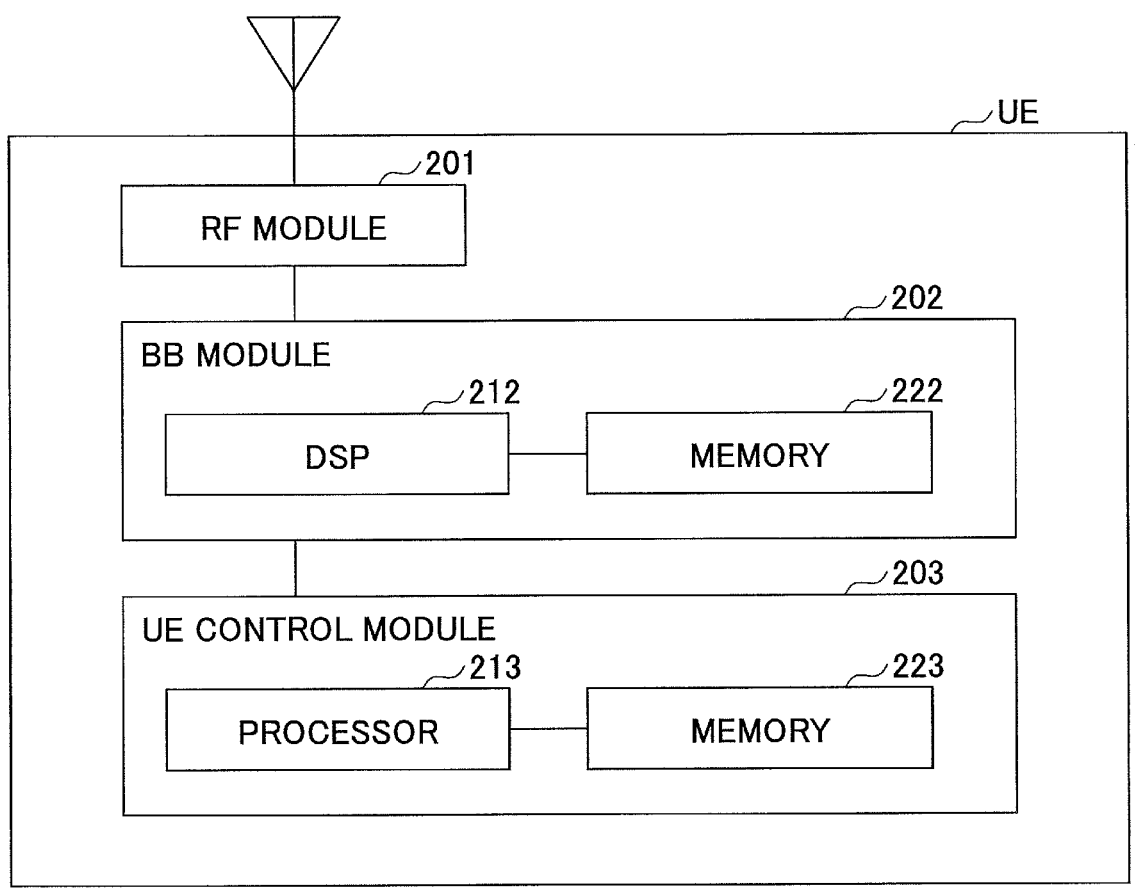
FIG. 6 is a diagram for illustrating an exemplary hardware arrangement of user equipment according to an embodiment.

FIG. 6 is a diagram for illustrating an exemplary hardware arrangement of user equipment according to an embodiment. FIG. 6 shows an arrangement closer to an implementation than FIG. 4. As illustrated in FIG. 6, the user equipment UE has an RF module 201 to perform operations related to radio signals, a BB processing module 202 to perform baseband signal operations and a UE control module 203 to perform operations for an upper layer or the like.

The RF module 201 performs D/A conversion, modulation, frequency conversion, power amplification and the like on digital baseband signals received from the BB processing module 202 to generate radio signals to be transmitted from an antenna. Also, the RF module 201 performs frequency conversion, A/D conversion, demodulation and the like on received radio signals to generate digital baseband signals and pass them to the BB processing module 202. For example, the RF module 201 includes a portion of the signal transmission unit 21 and a portion of the signal reception unit 22 as illustrated in FIG. 4.

The BB processing module 202 performs operations to interexchange between IP packets and digital baseband signals. The DSP 212 is a processor to perform signal processing at the BB processing module 202. The memory 222 is used as a working area for the DSP 212. For example, the BB processing module 202 may include a portion of the signal transmission unit 21, a portion of the signal reception unit 22, the RLC processing unit 24 and the MAC processing unit 25.

The UE control module 203 performs protocol operations for an IP layer, operations for various applications and so on. The processor 213 is a processor to perform operations executed by the UE control module 203. The memory 223 is used as a working area for the processor 213. The UE control module 203 includes the RRC processing unit 23 as illustrated in FIG. 4, for example.

<Procedure>

Procedures to change the length of the sequence number of RLC PDUs in the mobile communication system according to an embodiment are described with reference to the drawings.

(First Procedure)

FIG. 7 is a sequence diagram for illustrating an exemplary (first) procedure according to an embodiment. In this (first) procedure, re-establishment of an RLC entity is performed without execution of handover operations.

At step S101, the RRC processing unit 23 in the user equipment UE transmits a capability indication signal including capability information to the base station eNB. The RRC processing unit 13 in the base station eNB determines whether the user equipment UE has an ability of changing the length of the sequence number of RLC PDUs based on the capability information. Note that the capability indication signal may be an RRC signal (for example, UE Capability Information) or a MAC signal or a physical layer signal, for example. Also, certain UE categories may be predefined between the base station eNB and the user equipment UE, and the certain UE category may be stored in the capability information. In this case, the RRC processing unit 13 in the base station eNB determines whether the user equipment UE has an ability of changing the length of the sequence number of RLC PDUs based on the certain UE category. Also, the base station eNB may determine whether the user equipment UE has an ability of changing the length of the sequence number of RLC PDUs depending on the maximum number of CCs supported by the user equipment UE in CA, the number of MIMOs supported by the user equipment UE for communication or the like.

At step S102, the RRC processing unit 13 in the base station eNB transmits an RRC connection Reconfiguration signal to the user equipment UE. The RRC connection Reconfiguration signal includes an SCell addition/deletion instruction and information to indicate that the length of the sequence number of RLC PDUs should be changed (referred to as "sequence number length change instruction" hereinafter).

Note that the sequence number length change instruction may be represented with two bits, for example. For example, if the length of the sequence number is set as in conventional LTE specifications, "0" may be set in the sequence number length change instruction, and if the enhanced length of the sequence number may be set, "1" is set in the sequence number length change instruction. Also, the length of the sequence number may be set to various values by using more than or equal to three bits. Also, the sequence number length change instruction may indicate the length of the sequence number of uplink RLC PDUs and the length of the sequence number of downlink RLC PDUs separately or indicate either the length of the sequence number of uplink RLC PDUs or the length of the sequence number of downlink RLC PDUs.

At step S103, once the step S102 is executed, the signal transmission unit 11, the signal reception unit 12 and the RLC processing unit 14 in the base station eNB temporarily halt transmission and reception of radio signals.

At step S104, once the sequence number length change instruction is received at step S102, the signal transmission unit 21, the signal reception unit 22 and the RLC processing unit 24 in the user equipment UE temporarily halt transmission and reception of radio signals.

At step S105, the RLC processing unit 14 in the base station eNB performs re-establishment of an RLC entity. Also, the RLC processing unit 14 changes a processing manner to generate RLC PDUs with the length of the sequence number corresponding to the sequence number length change instruction transmitted to the user equipment UE at step S102. Note that if the sequence number length change instruction to indicate the length of the sequence number of uplink RLC PDUs and the length of the sequence number of downlink RLC PDUs separately is transmitted to the user equipment UE at step S102, the RLC processing unit 14 changes the processing manner to generate the uplink RLC PDUs and the downlink RLC PDUs with the respective indicated lengths of the sequence number.

At step S106, the RLC processing unit 24 in the user equipment UE performs re-establishment of the RLC entity. Also, the RLC processing unit 24 changes the processing manner to generate the RLC PDUs with the length of the sequence number corresponding to the sequence number length change instruction indicated from the base station eNB at step S102. Note that if the sequence number length change instruction to indicate the length of the sequence number of uplink RLC PDUs and the length of the sequence number of downlink RLC PDUs separately is received at step S102, the RLC processing unit 24 changes the processing manner to generate the uplink RLC PDUs and the downlink RLC PDUs with the respective indicated lengths of the sequence number.

At step S107, the RRC processing unit 23 in the user equipment UE transmits an RRC connection Reconfiguration complete signal to the base station eNB to indicate to the base station eNB that the re-establishment of the RLC entity has been completed.

At step S108, the signal transmission unit 21, the signal reception unit 22 and the RLC processing unit 24 in the user equipment UE use RLC PDUs having the changed length of the sequence number to start transmission and reception of signals from the timing of transmitting the RRC connection Reconfiguration complete signal at step S107, for example.

At step S109, the signal transmission unit 11, the signal reception unit 12 and the RLC processing unit 14 in the base station eNB use RLC PDUs having the changed length of the sequence number to start transmission and reception of signals from the timing of receiving the RRC connection Reconfiguration complete signal at step S107.

(Second Procedure)

FIG. 8 is a sequence diagram for illustrating an exemplary (second) procedure according to an embodiment. In this (second) procedure, handover operations are forcibly performed to use conventional LTE functionalities to execute the re-establishment of an RLC entity, and deactivation of an SCell, which is automatically performed during execution of the handover operations under the conventional LTE functionalities, can be suppressed. Note that what is not particularly referred to may be the same as FIG. 7.

The procedure at step S201 is the same as that at step S101 in FIG. 7, and descriptions thereof are omitted.

At step S202, the RRC processing unit 13 in the base station eNB transmits an RRC connection Reconfiguration signal to the user equipment UE. The RRC connection Reconfiguration signal includes an SCell addition/deletion instruction, an Intra-cell HO (Handover) instruction and a sequence number length change instruction.

The procedure at steps S203 and S204 is the same as in steps S103 and S104 in FIG. 7, respectively, and descriptions thereof are omitted.

At step S205, the RLC processing unit 14 in the base station eNB activates the Intra-cell HO operations to perform the re-establishment of an RLC entity. Also, the RLC processing unit 14 changes a processing manner to generate RLC PDUs with the length of the sequence number corresponding to the sequence number length change instruction transmitted to the user equipment UE at step S202. Note that if the sequence number length change instruction to indicate the length of the sequence number of uplink RLC PDUs and the length of the sequence number of downlink RLC PDUs separately is transmitted to the user equipment UE, the RLC processing unit 14 changes the processing manner to generate the uplink RLC PDUs and the downlink RLC PDUs with the respective indicated lengths of the sequence number.

At step S206, the RLC processing unit 24 in the user equipment UE activates the Intra-cell HO operations to perform the re-establishment of the RLC entity. Also, the RLC processing unit 24 changes the processing manner to generate RLC PDUs with the length of the sequence number corresponding to the sequence number length change instruction indicated from the base station eNB at step S202. Note that if the sequence number length change instruction to indicate the length of the sequence number of uplink RLC PDUs and the length of the sequence number of downlink RLC PDUs separately is received at step S202, the RLC processing unit 24 changes the processing manner to generate the uplink RLC PDUs and the downlink RLC PDUs with the respective indicated lengths of the sequence number.

Also, the MAC processing unit 25 in the user equipment UE controls to prevent an SCell already configured with CA from being deactivated in the Intra-cell HO operations at step S206. Note that the MAC processing unit 25 may temporarily halt a deactivation timer during execution of the Intra-cell HO operations. As a result, the timer will expire during execution of the Intra-cell HO operations so that the SCell can be prevented from being deactivated.

Also, the MAC processing unit 25 may detect completion of the HO operations and restart the deactivation timer. Also, the deactivation timer may be restarted in response to an instruction from the base station eNB. Also, in response to reception of a PDCCH (Physical Downlink Control Channel) at the user equipment UE, the MAC processing unit 25 may restart the deactivation timer.

Also, at step S206, the MAC processing unit 25 in the user equipment UE may control to prevent only a portion of SCells already configured with the CA from being deactivated. For example, the MAC processing unit 25 may control to prevent only the SCells having Cell Index or SCellIndex greater (or smaller) than a predetermined value from being deactivated. Also, if a LAA (License Assisted Access) cell is included in the SCells, the MAC processing unit 25 may control to prevent only the SCells other than the LAA cell (that is, cells of a license frequency band) from being deactivated. Note that the LAA cell means a cell where a Listen before Talk functionality is enabled, a cell of an unlicensed frequency band or the like.

The procedure at steps S207 to S209 is the same as that at steps S107 to S109, and descriptions thereof are omitted.

CONCLUSION

As stated above, according to the embodiments, there is provided user equipment for communicating with a base station in a mobile communication system supporting LTE, including a reception unit configured to receive an indication from the base station to change a sequence number length of an RLC PDU, a re-establishment unit configured to perform re-establishment of an RLC entity upon receiving the indication, and a communication unit configured to use the RLC PDU with the changed sequence number length to communicate with the base station after completion of the re-establishment. According to this user equipment, the technique for changing the length of the sequence number of RLC PDUs while controlling against throughput reduction is provided.

Also, the indication may include at least one of an indication to change the sequence number length of an uplink RLC PDU and an indication to change the sequence number length of a downlink RLC PDU, and in response to receiving the indication to change the sequence number length of the uplink RLC PDU, the communication unit may use the uplink RLC PDU with the changed sequence number length to communicate with the base station, and in response to receiving the indication to change the sequence number length of the downlink RLC PDU, the communication unit may use the downlink RLC PDU with the changed sequence number length to communicate with the base station. According to this arrangement, if an uplink peak rate is different from a downlink peak rate, only the length of the sequence number of downlink RLC PDUs can be changed, for example. As a result, it is possible to control against increase in a data amount of entire communication corresponding to enlargement of a size of a header portion of the RLC PDU.

Also, the user equipment may further include an indication unit configured to indicate that the user equipment has a capability of changing the sequence number length of the RLC PDU. According to this arrangement, only if the user equipment UE has a capability of changing the length of the sequence number of RLC PDUs, the user equipment UE can cause the base station to change the length of the sequence number of RLC PDUs.

Also, the indication may further include an indication to perform a handover operation, and in response to receiving the indication to perform the handover operation, the re-establishment unit may perform the handover operation to re-establish the RLC entity. According to this arrangement, the re-establishment of the RLC entity can be performed while using conventional LTE functionalities.

Also, in response to receiving the indication to perform the handover operation and the indication to change the sequence number length of the RLC PDU, the communication unit may perform the handover operation without deactivating a secondary cell. According to this arrangement, the base station eNB and the user equipment UE do not have to activate the SCell again, which can control against the throughput reduction.

Also, the communication unit may halt a deactivation timer during execution of the handover operation without deactivating the secondary cell. According to this arrangement, it is possible to prevent the SCell from being deactivated during execution of Intra-cell HO operations upon expiration of the timer.

Also, according to this embodiment, there is provided a base station for communicating with user equipment in a mobile communication system supporting LTE, including a transmission unit configured to transmit an indication to the user equipment to change a sequence number length of an RLC PDU, a re-establishment unit configured to perform re-establishment of an RLC entity in response to transmitting the indication, and a communication unit configured to use the RLC PDU with the changed sequence number length to communicate with the user equipment after completion of the re-establishment. According to this base station eNB, the technique for changing the length of the sequence number of RLC PDUs while controlling against throughput reduction is provided.

Also, according to this embodiment, a communication method in a mobile communication system having abase station and user equipment supporting LTE, including transmitting, by the base station, an indication to the user equipment to change a sequence number length of an RLC PDU, receiving, by the user equipment, the indication from the base station, performing, by the base station, re-establishment of an RLC entity, performing, by the user equipment, re-establishment of an RLC entity, using, by the base station, the RLC PDU with the changed sequence number length to communicate with the user equipment after completion of the re-establishment of the RLC entity, and using, by the user equipment, the RLC PDU with the changed sequence number length to communicate with the base station after completion of re-establishment of the RLC entity. According to this communication method, the technique for changing the length of the sequence number of RLC PDUs while controlling against throughput reduction is provided.

Also, "unit" in the arrangement of the above apparatuses may be replaced with "part", "circuit", "device" or the like.

SUPPLEMENT OF EMBODIMENT

In the above embodiments, if addition/deletion of an SCell is performed, the length of the sequence number is changed, but the embodiments are not limited as such. For example, no addition/deletion instruction of an SCell may be included in an RRC connection Reconfiguration signal at step S102 or S202. As a result, the length of the sequence number of RLC PDUs can be changed at arbitrary timings.

The arrangement of each apparatus (user equipment UE/base station eNB) as described in the present embodiments may be an arrangement implemented by a CPU (processor) executing programs in the apparatus including the CPU and a memory, an arrangement implemented by hardware such as a hardware circuit or the like including a processing logic as described in the present embodiments or an arrangement including a mixture of programs and hardware.

Although the embodiments of the present invention have been described, the disclosed invention is not limited to the embodiments, and those skilled in the art will understand various variations, modifications, substitutions, replacements and the like. The embodiments have been described with reference to specific numeral examples so as to facilitate understanding of the present invention, but unless specifically stated otherwise, these numerals are merely exemplary, and any appropriate value may be used. Segmentation of items in the above description is not essential to the present invention. Matters as described in two or more items may be combined as needed, or matters as described in a certain item may be applied to matters as described in other items (where they are not contrary). A boundary between functional units or processing units in functional block diagrams is not necessarily limited to a boundary between physical parts. Operations of multiple functional units may be implemented in a single part, or operations of a single functional unit may be implemented in multiple physical parts. Orders in sequences and flowcharts as stated in the embodiments may be replaced where they are not contrary. For convenience of descriptions of operations, the user equipment UE and the base station eNB have been described with reference to the functional block diagrams, but the apparatuses may be implemented in hardware, software or a combination thereof. The software executed by a processor in the user equipment UE in accordance with the embodiments of the present invention and the software executed by a processor in the base station eNB in accordance with the embodiments of the present invention may be stored in a RAM (Random Access Memory), a flash memory, a ROM (Read Only Memory), an EPROM, an EEPROM, a register, a hard disk (HDD), a removable disk, a CD-ROM, a database, a server and any other appropriate storage medium.

The present invention is not limited to the above embodiments, and various variations, modifications, substitutions, replacements and the like are included in the present invention without departing from the spirit of the present invention.

Note that the RRC processing unit 23 is one example of the reception unit in the embodiments. The RLC processing unit 24 is one example of the re-establishment unit. The signal transmission unit 21, the signal reception unit 22 and the RLC processing unit 24 are one example of the communication unit. The RRC processing unit 23 is one example of the capability indication unit. The signal transmission unit 11 and the RRC processing unit 13 are one example of the transmission unit. The RLC processing unit 14 is one example of the re-establishment unit. The signal transmission unit 11, the signal reception unit 12 and the RLC processing unit 14 are one example of the communication unit.

This patent application is based on and claims the benefit of priority of Japanese Patent Application No. 2015-100563 filed on May 15, 2015, the entire contents of which are hereby incorporated by reference.

LIST OF REFERENCE SYMBOLS

UE: user equipment
eNB: base station
11: signal transmission unit
12: signal reception unit
13: RRC processing unit
14: RLC processing unit
15: MAC processing unit
21: signal transmission unit
22: signal reception unit
23: RRC processing unit
24: RLC processing unit
25: MAC processing unit
101: RF module
102: BB processing module 103: device control module
104: communication IF
201: RF module
202: BB processing module
203: UE control module

The invention claimed is:

1. A user equipment for communicating with a base station, the user equipment comprising:
   a receiver that receives an indication included in a Radio Resource Control (RRC) connection reconfiguration signal from the base station to change a sequence number length of a Radio Link Control (RLC) Protocol Data Unit (PDU); and
   a processor that:
      performs re-establishment of an RLC entity upon receiving the indication, and
      uses the RLC PDU with the changed sequence number length to communicate with the base station after completion of the re-establishment,
   wherein the RRC connection reconfiguration signal includes the indication and an addition/deletion instruction of a secondary cell (SCell),
   wherein the changed sequence number length of the RLC PDU in an RLC-AM included in the indication is greater than or equal to 11 bits, and
   wherein the user equipment communicates with the base station in a mobile communication system supporting 3GPP Release 12 or subsequent Releases.

2. The user equipment as claimed in claim 1, wherein
   the indication includes at least one of an indication to change the sequence number length of an uplink RLC PDU and an indication to change the sequence number length of a downlink RLC PDU, and
   in response to receiving the indication to change the sequence number length of the uplink RLC PDU, the processor uses the uplink RLC PDU with the changed sequence number length to communicate with the base station, and
   in response to receiving the indication to change the sequence number length of the downlink RLC PDU, the processor uses the downlink RLC PDU with the changed sequence number length to communicate with the base station.

3. The user equipment as claimed in claim 2, wherein the processor further indicates that the user equipment has a capability of changing the sequence number length of the RLC PDU.

4. The user equipment as claimed in claim 2, wherein
   the indication further includes an indication to perform a handover operation, and
   in response to receiving the indication to perform the handover operation, the processor performs the handover operation to re-establish the RLC entity.

5. The user equipment as claimed in claim 1, wherein the processor further indicates that the user equipment has a capability of changing the sequence number length of the RLC PDU.

6. The user equipment as claimed in claim 5, wherein
   the indication further includes an indication to perform a handover operation, and
   in response to receiving the indication to perform the handover operation, the processor performs the handover operation to re-establish the RLC entity.

7. The user equipment as claimed in claim 1, wherein
   the indication further includes an indication to perform a handover operation, and
   in response to receiving the indication to perform the handover operation, the processor performs the handover operation to re-establish the RLC entity.

8. The user equipment as claimed in claim 7, wherein in response to receiving the indication to perform the handover operation and the indication to change the sequence number length of the RLC PDU, the processor performs the handover operation without deactivating the secondary cell.

9. The user equipment as claimed in claim 8, wherein the processor halts a deactivation timer during execution of the handover operation without deactivating the secondary cell.

10. A base station for communicating with a user equipment, the base station comprising:
    a transmitter that transmits an indication included in a Radio Resource Control (RRC) connection reconfiguration signal to the user equipment to change a sequence number length of a Radio Link Control (RLC) Protocol Data Unit (PDU); and
    a processor that:
       performs re-establishment of an RLC entity in response to transmitting the indication, and
       uses the RLC PDU with the changed sequence number length to communicate with the user equipment after completion of the re-establishment,
    wherein the RRC connection reconfiguration signal includes the indication and an addition/deletion instruction of a secondary cell (SCell),
    wherein the changed sequence number length of the RLC PDU in an RLC-AM included in the indication is greater than or equal to 11 bits, and
    wherein the base station communicates with the user equipment in a mobile communication system supporting 3GPP Release 12 or subsequent Releases.

11. A communication method in a mobile communication system having a base station and a user equipment, the communication method comprising:
    transmitting, by the base station, an indication included in a Radio Resource Control (RRC) connection reconfiguration signal to the user equipment to change a sequence number length of a Radio Link Control (RLC) Protocol Data Unit (PDU);
    receiving, by the user equipment, the indication included in the RRC connection reconfiguration signal from the base station;
    performing, by the base station, re-establishment of an RLC entity;
    performing, by the user equipment, re-establishment of an RLC entity;
    using, by the base station, the RLC PDU with the changed sequence number length to communicate with the user equipment after completion of the re-establishment of the RLC entity; and
    using, by the user equipment, the RLC PDU with the changed sequence number length to communicate with the base station after completion of re-establishment of the RLC entity,
    wherein the RRC connection reconfiguration signal includes the indication and an addition/deletion instruction of a secondary cell (SCell),
    wherein the changed sequence number length of the RLC PDU in an RLC-AM included in the indication is greater than or equal to 11 bits, and
    wherein the mobile communication system supports 3GPP Release 12 or subsequent Releases.

* * * * *